United States Patent
Akada

(10) Patent No.: US 9,878,936 B2
(45) Date of Patent: Jan. 30, 2018

(54) ULTRAVIOLET ABSORBING GLASS ARTICLE

(71) Applicant: Asahi Glass Company, Limited, Chiyoda-ku (JP)

(72) Inventor: Shuichi Akada, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/133,330

(22) Filed: Apr. 20, 2016

(65) Prior Publication Data
US 2016/0229735 A1  Aug. 11, 2016

Related U.S. Application Data

(63) Continuation of application No. PCT/JP2014/083044, filed on Dec. 12, 2014.

(30) Foreign Application Priority Data

Dec. 13, 2013 (JP) .................... 2013-258558
Sep. 8, 2014 (JP) .................... 2014-182168

(51) Int. Cl.
| | |
|---|---|
| *C03C 4/08* | (2006.01) |
| *C03C 3/087* | (2006.01) |
| *C03C 3/078* | (2006.01) |
| *C03C 4/02* | (2006.01) |
| *B60J 1/00* | (2006.01) |

(52) U.S. Cl.
CPC .......... *C03C 3/087* (2013.01); *B60J 1/00* (2013.01); *C03C 3/078* (2013.01); *C03C 4/02* (2013.01); *C03C 4/085* (2013.01)

(58) Field of Classification Search
CPC . C03C 3/087; C03C 4/02; C03C 4/085; B60J 1/00
See application file for complete search history.

(56) References Cited

U.S. PATENT DOCUMENTS

| | | | |
|---|---|---|---|
| 6,071,840 A | 6/2000 | Sasage et al. | |
| 8,785,338 B2 * | 7/2014 | Tsuzuki | C03C 3/087 501/71 |
| 2002/0164487 A1 | 11/2002 | Seto et al. | |
| 2004/0038799 A1 | 2/2004 | Landa et al. | |
| 2004/0157721 A1 | 8/2004 | Foguenne et al. | |
| 2013/0264528 A1 * | 10/2013 | Mitamura | C03C 4/085 252/586 |
| 2013/0306900 A1 * | 11/2013 | Shimada | C03C 3/087 252/62 |

FOREIGN PATENT DOCUMENTS

| | | |
|---|---|---|
| EP | 0 825 156 A1 | 2/1998 |
| JP | 8-245238 | 9/1996 |
| JP | 11-217234 | 8/1999 |
| JP | 2000-247679 | 9/2000 |
| JP | 2003-508338 | 3/2003 |
| WO | WO97/17303 A1 | 5/1997 |
| WO | WO 2013/022225 A2 | 2/2013 |
| WO | WO 2013/022225 A3 | 2/2013 |

OTHER PUBLICATIONS

English Translation of International Search Report dated Mar. 17, 2015 in PCT/JP2014/083044, filed Dec. 12, 2014.

* cited by examiner

*Primary Examiner* — Elizabeth E Mulvaney
(74) *Attorney, Agent, or Firm* — Oblon, McClelland, Maier & Neustadt, L.L.P.

(57) ABSTRACT

An ultraviolet absorbing glass article comprising, as a glass matrix composition in mass % based on oxides, from 66 to 75% of $SiO_2$, from 10 to 20% of $Na_2O$, from 5 to 15% of CaO, from 0 to 6% of MgO, from 0 to 5% of $Al_2O_3$, from 0 to 5% of $K_2O$, from 0.13 to 0.9% of FeO, at least 0.8% and less than 2.4% of total iron as represented by $Fe_2O_3$, and more than 1% and at most 5% of $TiO_2$, containing from 100 to 500 mass ppm of CoO, from 0 to 70 mass ppm of Se and from 0 to 800 mass ppm of $Cr_2O_3$ in a total content of CoO, Se and $Cr_2O_3$ of less than 0.1 mass % based on the total content of components in the glass matrix composition, and having an ultraviolet transmittance of at most 2% at a thickness of 3.5 mm.

21 Claims, No Drawings

ULTRAVIOLET ABSORBING GLASS ARTICLE

TECHNICAL FIELD

The present invention relates to an ultraviolet absorbing glass article suitable as dark gray glass for vehicles (particularly for automobiles).

BACKGROUND ART

As rear side glass and rear glass for automobiles, deep gray glass having a remarkably decreased visible light transmittance (so-called dark gray glass or privacy glass) has been practically used. Such privacy glass is excellent in interior comfortability and reduction in air-conditioning load, selectivity of color tone which imparts high-class sense, design properties excellent in view of the design, interior privacy protection, etc., due to a high sunlight shielding performance in a wide wavelength region from an ultraviolet region to an infrared region.

Patent Documents 1 and 2 disclose conventional privacy glass.

Patent Document 1 discloses an infrared and ultraviolet absorbing glass article comprising components of soda lime silica glass and in addition, components which act as an infrared absorbing material, an ultraviolet absorbing material and a coloring agent. This glass article is colored green, and has a light transmittance of at most about 60%, a total solar ultraviolet transmittance of at most about 40%, a total solar infrared transmittance of at most about 45% and a total solar energy transmittance of at most about 50%. Patent Document 2 discloses a glass article having a total solar ultraviolet transmittance of at most 1%.

PRIOR ART DOCUMENTS

Patent Documents

Patent Document 1: JP-A-2003-508338
Patent Document 2: WO2013/022225

DISCLOSURE OF INVENTION

Technical Problem

In recent years, interest in ultraviolet shield is developing, and thus privacy glass with a lower ultraviolet transmittance (TUV) has been desired. On the other hand, it is also required to secure the rear visibility for safety driving.

However, although the glass in Patent Document 1 satisfies a low ultraviolet transmittance (TUV), it cannot satisfy requirements in view of securement of visibility since its color is dark. Further, the glass in Patent Document 2 is difficult to produce in some cases since its temperature is high (1,443° C.) when its viscosity is 100 poise, according to studies by the present inventor.

To solve the above problems, the object of the present invention is to provide an ultraviolet absorbing glass article which is easily produced, which has a low ultraviolet transmittance (TUV) suitable as privacy glass for vehicles particularly for automobiles, and which satisfies requirements of securement of visibility.

Solution to Problem

To achieve the above objects, the present invention provides an ultraviolet absorbing glass article comprising, as a glass matrix composition as represented by mass % based on oxides:

$SiO_2$: 66 to 75%,
$Na_2O$: 10 to 20%,
$CaO$: 5 to 15%,
$MgO$: 0 to 6%,
$Al_2O_3$: 0 to 5%,
$K_2O$: 0 to 5%,
$FeO$: 0.13 to 0.9%,
total iron as represented by $Fe_2O_3$: at least 0.8% and less than 2.4%,
$TiO_2$: more than 1% and at most 5%;
containing from 100 to 500 mass ppm of CoO, from 0 to 70 mass ppm of Se and from 0 to 800 mass ppm of $Cr_2O_3$ in a total content of CoO, Se and $Cr_2O_3$ of less than 0.1 mass % based on the total content of components of the glass matrix composition; and
having an ultraviolet transmittance (TUV) (ISO9050: 2003) of at most 2% at a thickness of 3.5 mm.

The present invention further provides an ultraviolet absorbing glass article comprising, as a glass matrix composition as represented by mass % based on oxides:

$SiO_2$: 66 to 75%,
$Na_2O$: 10 to 20%,
$CaO$: 5 to 15%,
$MgO$: 0 to 6%,
$Al_2O_3$: 0 to 5%,
$K_2O$: 0 to 5%,
$FeO$: 0.13 to 0.9%,
total iron as represented by $Fe_2O_3$: at least 0.8% and less than 2.4%,
$TiO_2$: more than 1% and at most 5%;
containing from 200 to 500 mass ppm of CoO, from 3 to 70 mass ppm of Se and from 0 to 800 mass ppm of $Cr_2O_3$ in a total content of CoO, Se and $Cr_2O_3$ of less than 0.1 mass % based on the total content of components of the glass matrix composition; and
having an ultraviolet transmittance (TUV) (ISO9050: 2003) of at most 2% at a thickness of 3.5 mm.

The ultraviolet absorbing glass article of the present invention may further contain from 0 to 1 mass % of NiO based on the total content of components of the glass composition.

The ultraviolet absorbing glass article of the present invention preferably has an ultraviolet transmittance (TUV) (ISO 9050:2003) of at most 2% at a thickness of 2.5 mm.

The ultraviolet absorbing glass article of the present invention preferably has a visible light transmittance (TVA) (JIS R3106 (1998)) of at least 10% and at most 20% as measured by using a standard illuminant A at a thickness of 3.5 mm.

The ultraviolet absorbing glass article of the present invention preferably has a visible light transmittance (TVA) (JIS R3106 (1998)) of at least 10% and at most 35% as measured by using a standard illuminant A at a thickness of 2.5 mm.

The ultraviolet absorbing glass article of the present invention preferably has a solar transmittance (TE) (JIS R3106 (1998)) of at most 25% at a thickness of 3.5 mm.

The ultraviolet absorbing glass article of the present invention preferably has a solar transmittance (TE) (JIS R3106 (1998)) of at most 35% at a thickness of 2.5 mm.

The ultraviolet absorbing glass article of the present invention preferably has a dominant wavelength ($\lambda D$) of from 485 to 580 nm as measured by using a standard illuminant C at a thickness of 3.5 mm, and an excitation purity (Pe) of at most 25% as measured by using a standard illuminant C.

The ultraviolet absorbing glass article of the present invention preferably has a dominant wavelength (λD) of from 485 to 580 nm as measured by using a standard illuminant C at a thickness of 2.5 mm, and an excitation purity (Pe) of at most 45% as measured by using a standard illuminant C.

The ultraviolet absorbing glass article of the present invention is preferably such that the contents as represented by mass % of trivalent iron as represented by $Fe_2O_3$ and $TiO_2$ satisfy the following formula:

$$-3.58 \times (Fe_2O_3) - 0.606 \times (TiO_2) \leq -3.5$$

In this specification, "to" used to show the range of the numerical values is used to include the numerical values before and after it as the lower limit value and the upper limit value, and unless otherwise specified, the same applies hereinafter.

Advantageous Effects of Invention

The present invention provides an ultraviolet absorbing glass article which is easily produced, which is suitable as privacy glass for vehicles, which has a low ultraviolet transmittance (TUV) and which satisfies requirements of securement of visibility.

DESCRIPTION OF EMBODIMENTS

The ultraviolet absorbing glass article of the present invention comprises, as a glass matrix composition as represented by mass % based on oxides, from 66 to 75% of $SiO_2$, from 10 to 20% of $Na_2O$, from 5 to 15% of CaO, from 0 to 6% of MgO, from 0 to 5% of $Al_2O_3$, from 0 to 5% of $K_2O$, from 0.13 to 0.9% of FeO, at least 0.8% and less than 2.4% of total iron as represented by $Fe_2O_3$, and more than 1% and at most 5% of $TiO_2$, contains from 100 to 500 mass ppm of CoO, from 0 to 70 mass ppm of Se and from 0 to 800 mass ppm of $Cr_2O_3$ in a total content of CoO, Se and $Cr_2O_3$ of less than 0.1 mass % based on the total content of components of the glass matrix composition, and has an ultraviolet transmittance (TUV) (ISO9050: 2003) of at most 2% at a thickness of 3.5 mm.

The reason why the above coloring components are limited is described below. % means mass %, and ppm means mass ppm unless otherwise specified.

$SiO_2$ is a component constituting the network and is an essential component. When the $SiO_2$ content is at least 66%, favorable weather resistance will be obtained, and when it is at most 75%, the viscosity will not be too low, such being favorable for melting. It is preferably at least 66% and at most 72%, more preferably at least 67% and at most 70%.

$Na_2O$ is a component which accelerates melting of materials and is an essential component. When the $Na_2O$ content is at least 10%, melting of materials will be accelerated, and when it is at most 20%, the weather resistance will not be impaired. It is preferably at least 11% and at most 18%, more preferably at least 12% and at most 16%.

CaO is a component which accelerates melting of materials and improves the weather resistance, and is an essential component. When the CaO content is at least 5%, melting of materials will be accelerated and the weather resistance will be improved, and when it is at most 15%, devitrification will be suppressed. It is preferably at least 6% and at most 13%, more preferably at least 7% and at most 11%.

MgO is a component which accelerates melting of materials and improves the weather resistance, and is a selected component. When the MgO content is at most 6%, devitrification will be suppressed. It is preferably at most 5%, more preferably at most 4%.

$Al_2O_3$ is a component which improves the weather resistance and is a selected component. When the $Al_2O_3$ content is at most 5%, the viscosity will not be too high, such being favorable for melting. It is preferably at most 4%, more preferably at most 3%.

$K_2O$ is a component which accelerates melting of the materials and is a selected component. When the $K_2O$ content is at most 5%, damages on a refractory of the melting furnace by volatilization will be suppressed. It is preferably at most 4%, more preferably at most 3%.

FeO is a component which absorbs the heat energy and is an essential component. When the FeO content is at least 0.13%, a sufficiently low solar transmittance will be obtained. On the other hand, when it is at most 0.9%, thermal efficiency at the time of melting will not be impaired, and it is possible to prevent molten glass from staying at the bottom of the melting furnace far from the heat source. It is preferably at least 0.15% and at most 0.7%, more preferably at least 0.18% and at most 0.40%.

When the content of total iron as calculated as $Fe_2O_3$ (that is, the content of total iron including the above FeO) is at least 0.8%, the visible light transmittance will not be too high, and when it is less than 2.4%, the visible light transmittance will not be too low. That is, the visible light transmittance is within an appropriate range. The content of total iron is more preferably from 1.0 to 1.8%.

In total iron, trivalent iron is a component which absorbs ultraviolet rays. If its content is too low, the visible light transmittance is too high, and if its content is too high, the glass tends to be deeply yellowish, and the excitation purity will be too high. The contents of trivalent iron as calculated as $Fe_2O_3$ and $TiO_2$ preferably satisfy the following formula:

$$-3.58 \times (Fe_2O_3) - 0.606 \times (TiO_2) \leq -3.5 \qquad (1)$$

$TiO_2$ is a component which lowers the ultraviolet transmittance (TUV) and is an essential component. When the $TiO_2$ content is higher than 1%, the ultraviolet transmittance will not be high, and when it is at most 5%, the glass will not be too yellowish and an increase in the excitation purity will be suppressed. Further, $TiO_2$ has an effect to lower the viscosity of the molten glass at the time of melting, and prevents staying of the molten glass. It is preferably at least 1.2% and at most 4%, more preferably at least 1.5% and at most 3.3%.

Se is not essential, but may be contained since it is a component to make the glass be reddish. The Se content is preferably at least 3 ppm to prevent the glass from being bluish, and when the Se content is at most 70 ppm, it is possible to prevent the glass from being yellowish. The Se content is more preferably at least 5 ppm and at most 50 ppm, further preferably at least 10 ppm and at most 30 ppm.

CoO is a component which makes the glass be bluish and is an essential component. When the CoO content is at least 100 ppm, it is possible to prevent the glass from being yellowish, and when it is at most 500 ppm, it is possible to prevent the glass from being bluish. The CoO content is more preferably from 200 to 500 ppm, further preferably from 280 to 420 ppm.

$Cr_2O_3$ is a component which lowers the visible light transmittance without increasing the excitation purity so much and is an optional component in the glass article of the present invention. When the $Cr_2O_3$ content is at most 800 ppm, an increase in the excitation purity will be suppressed. The $Cr_2O_3$ content is preferably at most 300 ppm.

The ultraviolet absorbing glass article of the present invention preferably comprises, as a glass matrix composition as represented by mass % based on oxides, from 66 to 75% of $SiO_2$, from 10 to 20% of $Na_2O$, from 5 to 15% of CaO, from 0 to 6% of MgO, from 0 to 5% of $Al_2O_3$, from 0 to 5% of $K_2O$, from 0.13 to 0.9% of FeO, at least 0.8% and less than 2.4% of total iron as represented by $Fe_2O_3$, and more than 1% and at most 5% of $TiO_2$, contains from 200 to 500 mass ppm of CoO, from 3 to 70 mass ppm of Se and from 0 to 800 mass ppm of $Cr_2O_3$ in a total content of CoO, Se and $Cr_2O_3$ of less than 0.1 mass % based on the total content of components of the glass matrix composition, and has an ultraviolet transmittance (TUV) (ISO9050: 2003) of at most 2% at a thickness of 3.5 mm.

In practical production, a refining agent such as salt cake is used, and as its trace, $SO_3$ in an amount at a level of from 0.05 to 1.0% usually remains in the glass and is accepted.

The glass article of the present invention further contains an oxide of Ni in addition to the above components. In such a case, the content as calculated as an oxide (NiO) is from 0 to 1 mass % based on the total content of components of the glass matrix composition. By incorporating NiO within the above range, it is possible to make the glass article be brownish and to lower the solar transmittance.

The glass article of the present invention may contain oxides of B, Ba, Sr, Li, Zn, Pb, P, Zr and Bi. Each of the contents as calculated as oxides ($B_2O_3$, BaO, SrO, $Li_2O$, ZnO, PbO, $P_2O_5$, $ZrO_2$ and $Bi_2O_3$) may be from 0 to 1 mass % based on the total content of components of the glass matrix composition. The upper limit of the total content of the above respective oxides is preferably 2 mass %.

Further, the glass article may contain Sb, As, Cl and F. Such elements may be intentionally included from a melting aid and a refining agent. Otherwise, they may be included as impurities from the materials or cullet. The content of such components may be from 0 to 0.1 mass % based on the total content of components in the glass matrix composition.

Further, the glass article may contain an oxide of Sn. Sn is in contact with glass at the time of forming by float process and infiltrates into the glass. The content of Sn as calculated as an oxide ($SnO_2$) may be from 0 to 0.1 mass % based on the total content of components in the glass matrix composition.

Further, the glass article may contain oxides of Mn, Cu, Mo, Nd and Er. The total content of them as calculated as oxides ($MnO_2$, CuO, $MoO_3$, $Nd_2O_3$, $Er_2O_3$) may be from 0 to 0.1 mass % based on the total content of components in the glass matrix composition.

Further, the glass article of the present invention contains substantially no ultraviolet absorber such as V or W. Here, "containing substantially no" means that such an element is not intentionally incorporated, and specifically, the content of each element is at most about 100 ppm in the glass.

In a case where the glass article of the present invention is used as privacy glass for vehicles particularly for automobiles, it is a glass plate having the above composition and preferably has the following optical properties.

Further, it has a visible light transmittance (TVA) of preferably from 10 to 20%, more preferably from 12 to 18% at a thickness of 3.5 mm. Further, it has a solar transmittance (TE) of preferably at most 25%, more preferably at most 23% at a thickness of 3.5 mm.

Further, it has an ultraviolet transmittance (TUV) of preferably at most 2%, more preferably 1% at a thickness of 3.5 mm.

Further, in addition to the above optical properties, it preferably has a dominant wavelength λD of from 485 to 580 nm at a thickness of 3.5 mm and an excitation purity (Pe) of at most 25%, and particularly preferably has an excitation purity (Pe) of at most 10%.

In this specification, the solar transmittance and the visible light transmittance were determined in accordance with JIS-R3106 (1998), and the ultraviolet transmittance is determined in accordance with ISO 9050 (2003). Further, the visible light transmittance is calculated employing a standard illuminant A 2 degrees field of vision, and the dominant wavelength and the excitation purity are calculated employing a standard illuminant C 2 degrees field of vision.

In a case where the glass article of the present invention is used as thin privacy glass for vehicles, it is a glass plate having the above composition and preferably has the following optical properties.

It has a visible light transmittance (TVA) of preferably from 10 to 35%, more preferably from 15 to 30% at a thickness of 2.5 mm. Further, it has a solar transmittance (TE) of preferably at most 35%, more preferably at most 30% at a thickness of 2.5 mm.

Further, it has an ultraviolet transmittance (TUV) of preferably at most 2%, more preferably 1% at a thickness of 2.5 mm.

Further, in addition to the above optical properties, it preferably has a dominant wavelength λD of from 485 to 580 nm at a thickness of 2.5 mm and an excitation purity (Pe) of at most 45%, particularly preferably has an excitation purity (Pe) of at most 35%.

Further, the glass article of the present invention has an effect such that when the temperature at which the viscosity is 100 poise is at most 1,440° C., the glass is easily produced. The temperature at which the viscosity is 100 poise is preferably at most 1,435° C., more preferably at most 1,410° C., particularly preferably at most 1,400° C.

The method for producing the glass article of the present invention is not particularly limited, and the glass article may be produced, for example, as follows. Prepared materials are continuously supplied to a melting furnace and heated to about 1,500° C. e.g. by heavy oil to vitrify the materials. Then, the molten glass is refined and formed into a plate-shape glass ribbon having a predetermined thickness e.g. by float process. Then, the glass ribbon is cut into a predetermined shape to produce the glass article of the present invention. Then, as the case requires, the cut glass may be subjected to tempering treatment, or may be formed into a laminated glass or a double grazing.

EXAMPLES

Ex. 1 to 21

A material batch was prepared by using as materials silica sand, feldspar, dolomite, soda ash, salt cake, blast-furnace slag, ferric oxide, titanium oxide, cobalt oxide, sodium selenite and chromium oxide. Soda lime silicate glass comprising from 65 to 70 mass % of $SiO_2$, 1.8 mass % of $Al_2O_3$, 8.4 mass % of CaO, 4.6 mass % of MgO, 13.3 mass % of $Na_2O$, 0.7 mass % of $K_2O$ and 0.2 mass % of $SO_3$ as the matrix components of the glass matrix composition was used. The $SiO_2$ content was adjusted to obtain the desired composition so that the total amount of the matrix components and t-$Fe_2O_3$ (total iron as calculated as $Fe_2O_3$), CoO, Se, $TiO_2$ and $Cr_2O_3$ added as absorbing components would be 100 mass %. The batch was put in a platinum-rhodium crucible and melted in an electric furnace in an atmosphere at an $O_2$ concentration of about 0.5%, poured on a carbon plate and annealed in another electric furnace. The obtained glass block was cut, and a part was polished and the composition was analyzed by a fluorescent X-ray spectroscopic analyzer. Another part was mirror-polished and formed to a thickness of 3.5 mm or 2.5 mm, and the spectral transmittance was measured by a spectrophotometer. The FeO content was obtained by calculation from the infrared transmittance at a wavelength of 1,000 nm. The contents of the absorbing components in the glass in each of Ex. 1 to 21 and optical properties of the glass are shown below.

Ex. 22 to 24

Further, the mixed material batch and the glass cullet were continuously vitrified in a melting furnace, and the molten glass was refined and formed into a plate by float process. Then, the obtained glass ribbon was annealed and then cut. Of the obtained plate glass, the composition was analyzed by a fluorescent X-ray spectroscopic analyzer. Further, the spectral transmittance was measured by a spectrophotometer. The FeO content was obtained by calculation from the infrared transmittance at a wavelength of 1,000 nm. The contents of the absorbing components in the glass in each of Ex. 22 to 24 and optical properties of the glass are shown below.

TABLE 1

| | | 1 | 2 | 3 | 4 | 5 | 6 | 7 |
|---|---|---|---|---|---|---|---|---|
| Composition/mass % | t-Fe$_2$O$_3$ | 1.03 | 1.03 | 1.04 | 1.05 | 1.01 | 1.01 | 1.4 |
| /mass % | TiO$_2$ | 1.63 | 1.56 | 2.54 | 3.28 | 2.55 | 3.28 | 2.23 |
| /mass ppm | CoO | 214 | 355 | 300 | 301 | 411 | 413 | 307 |
| /mass ppm | Cr$_2$O$_3$ | 62 | 64 | 65 | 57 | 6 | 5 | 0 |
| /mass ppm | Se | 43 | 19 | 18 | 19 | 21 | 16 | 16 |
| /mass % | FeO | 0.26 | 0.22 | 0.22 | 0.22 | 0.2 | 0.19 | 0.26 |
| (value in Formula 1) | | −3.7 | −3.8 | −4.4 | −4.9 | −4.4 | −4.8 | −5.3 |
| Thickness/mm | | 3.5 | 3.5 | 3.5 | 3.5 | 3.5 | 3.5 | 3.5 |
| Optical properties/% | TVA | 18.7 | 14.4 | 15.4 | 15.5 | 12.3 | 12.4 | 13.6 |
| /% | TE | 20.3 | 21.3 | 21.5 | 21.6 | 22.4 | 22.5 | 17.8 |
| /% | TUV | 2.0 | 2.0 | 1.1 | 0.7 | 1.2 | 0.8 | 0.6 |
| /nm | λD | 577 | 488 | 567 | 569 | 487 | 500 | 572 |
| /% | Pe | 23.9 | 5 | 9.7 | 14.7 | 5.2 | 2.4 | 17.3 |
| Thickness/mm | | 2.5 | 2.5 | 2.5 | 2.5 | 2.5 | 2.5 | 2.5 |
| Optical properties/% | TVA | 29.4 | 24.4 | 25.5 | 25.7 | 21.8 | 21.8 | 23.4 |
| /% | TE | 30.7 | 31.7 | 31.9 | 32 | 32.7 | 32.7 | 27.8 |
| /% | TUV | 5 | 4.8 | 3.1 | 2.2 | 3.3 | 2.5 | 2 |
| /nm | λD | 577 | 488 | 567 | 569 | 486 | 498 | 572 |
| /% | Pe | 17.3 | 3.7 | 6.8 | 10.4 | 4 | 1.9 | 12.3 |

TABLE 2

| | | 8 | 9 | 10 | 11 | 12 | 13 | 14 |
|---|---|---|---|---|---|---|---|---|
| Composition/mass % | t-Fe$_2$O$_3$ | 1.74 | 1.88 | 1.13 | 1.41 | 1.13 | 1.41 | 1.03 |
| /mass % | TiO$_2$ | 1.59 | 2.6 | 3.06 | 2.14 | 2.55 | 1.63 | 3.06 |
| /mass ppm | CoO | 325 | 412 | 354 | 335 | 354 | 335 | 354 |
| /mass ppm | Cr$_2$O$_3$ | 0 | 0 | 0 | 0 | 0 | 0 | 0 |
| /mass ppm | Se | 27 | 3 | 22 | 22 | 22 | 22 | 22 |
| /mass % | FeO | 0.31 | 0.38 | 0.29 | 0.32 | 0.29 | 0.38 | 0.27 |
| (value in Formula 1) | | −6 | −6.8 | −4.7 | −5.1 | −4.4 | −4.5 | −4.5 |
| Thickness/mm | | 3.5 | 3.5 | 3.5 | 3.5 | 3.5 | 3.5 | 3.5 |
| Optical properties/% | TVA | 11.9 | 12.7 | 11.6 | 11.4 | 13 | 11.5 | 13.1 |
| /% | TE | 14.6 | 12 | 15.2 | 13.6 | 16.2 | 11.7 | 17.3 |
| /% | TUV | 0.4 | 0.2 | 0.6 | 0.5 | 1.0 | 0.9 | 0.9 |
| /nm | λD | 572 | 496 | 570 | 570 | 563 | 563 | 564 |
| /% | Pe | 19.2 | 10.8 | 17 | 17.1 | 8.5 | 9.4 | 9.7 |
| Thickness/mm | | 2.5 | 2.5 | 2.5 | 2.5 | 2.5 | 2.5 | 2.5 |
| Optical properties/% | TVA | 21.3 | 22.1 | 20.8 | 20.6 | 22.6 | 20.8 | 22.7 |
| /% | TE | 24.1 | 20.9 | 24.9 | 22.9 | 26 | 20.5 | 27.3 |
| /% | TUV | 1.4 | 1 | 2 | 1.8 | 3 | 2.7 | 2.8 |
| /nm | λD | 572 | 496 | 570 | 570 | 563 | 563 | 564 |
| /% | Pe | 13.8 | 8 | 12.1 | 12.2 | 6 | 6.6 | 6.8 |

TABLE 3

| | | 15 | 16 | 17 | 18 | 19 |
|---|---|---|---|---|---|---|
| Composition/mass % | t-Fe$_2$O$_3$ | 1.31 | 1.13 | 1.13 | 1.13 | 1.41 |
| /mass % | TiO$_2$ | 2.14 | 2.55 | 2.55 | 2.55 | 1.63 |
| /mass ppm | CoO | 335 | 354 | 354 | 354 | 335 |
| /mass ppm | Cr$_2$O$_3$ | 0 | 0 | 0 | 0 | 0 |
| /mass ppm | Se | 22 | 3 | 9 | 17 | 17 |
| /mass % | FeO | 0.3 | 0.3 | 0.33 | 0.28 | 0.26 |
| (value in Formula 1) | | −4.8 | −4.4 | −4.3 | −4.5 | −5 |
| Thickness/mm | | 3.5 | 3.5 | 3.5 | 3.5 | 3.5 |
| Optical properties/% | TVA | 12.3 | 18.9 | 16 | 13.5 | 14 |
| /% | TE | 15.4 | 18.7 | 15.5 | 17 | 18.1 |
| /% | TUV | 0.7 | 2.0 | 1.5 | 1.1 | 1.0 |
| /nm | λD | 569 | 487 | 492 | 547 | 556 |
| /% | Pe | 13.3 | 16.9 | 10 | 4.4 | 4.6 |
| Thickness/mm | | 2.5 | 2.5 | 2.5 | 2.5 | 2.5 |
| Optical properties/% | TVA | 21.8 | 29.5 | 26.2 | 23.3 | 23.9 |
| /% | TE | 25.1 | 29 | 25.3 | 27 | 28.3 |
| /% | TUV | 2.3 | 4.8 | 4 | 3 | 2.9 |
| /nm | λD | 569 | 487 | 492 | 546 | 555 |
| /% | Pe | 9.4 | 12.5 | 7.4 | 3 | 3.2 |

TABLE 4

|  |  | 20 | 21 | 22 | 23 | 24 |
|---|---|---|---|---|---|---|
| Composition/mass % | t-Fe₂O₃ | 1.57 | 1.7 | 1.63 | 1.57 | 1.43 |
| /mass % | TiO₂ | 2.6 | 2.78 | 2.69 | 2.59 | 2.48 |
| /mass ppm | CoO | 204 | 225 | 373 | 323 | 280 |
| /mass ppm | Cr₂O₃ | 50 | 49 | 65 | 65 | 68 |
| /mass ppm | Se | 25 | 26 | 24 | 25 | 25 |
| /mass % | FeO | 0.33 | 0.36 | 0.37 | 0.35 | 0.32 |
| (value in Formula 1) | | −7.2 | −7.8 | −7.5 | −7.2 | −6.6 |
| Thickness/mm | | 3.5 | 3.5 | 3.5 | 3.5 | 3.5 |
| Optical properties/% | TVA | 17.2 | 14.6 | 9.8 | 11.7 | 14.9 |
| /% | TE | 15.2 | 13 | 11 | 12.3 | 14.9 |
| /% | TUV | 0.4 | 0.2 | 0.2 | 0.3 | 0.6 |
| /nm | λD | 574 | 574 | 567 | 570 | 570 |
| /% | Pe | 35.3 | 39.7 | 20 | 24 | 22.2 |
| Thickness/mm | | 2.5 | 2.5 | 2.5 | 2.5 | 2.5 |
| Optical properties/% | TVA | 27.7 | 24.6 | 18.5 | 21 | 24.9 |
| /% | TE | 24.9 | 22.1 | 19.6 | 21.3 | 24.5 |
| /% | TUV | 1.4 | 0.9 | 1 | 1.3 | 2 |
| /nm | λD | 574 | 574 | 567 | 570 | 570 |
| /% | Pe | 26 | 29.5 | 14.4 | 17.3 | 16.1 |

Further, the present inventor has confirmed that the temperature of the glass in Ex. 2 of the present invention at which the viscosity is 100 poise is 1,406° C., and the temperature of the glass in Ex. 4 of the present invention at which the viscosity is 100 poise is 1,348° C., whereas the temperature of the glass in Patent Document 2 at which the viscosity is 100 poise is 1,443° C. Accordingly, it was confirmed that the glass article of the present invention is easily produced as compared with a conventional glass article.

INDUSTRIAL APPLICABILITY

According to the present invention, it is possible to provide an ultraviolet absorbing glass article which is easily produced, which has a low ultraviolet transmittance (TUV) suitable as privacy glass for vehicles, and which satisfies requirements of securement of visibility, and the glass article is useful as a glass plate for a rear side glass window and for a rear glass window particularly for automobiles.

This application is a continuation of PCT Application No. PCT/JP2014/083044, filed on Dec. 12, 2014, which is based upon and claims the benefit of priority from Japanese Patent Application No. 2013-258558 filed on Dec. 13, 2013 and Japanese Patent Application No. 2014-182168 filed on Sep. 8, 2014. The contents of those applications are incorporated herein by reference in their entireties.

What is claimed is:

1. An ultraviolet absorbing glass article comprising, as a glass matrix composition as represented by mass % based on oxides:
   $SiO_2$: 66 to 75%,
   $Na_2O$: 10 to 20%,
   CaO: 5 to 15%,
   MgO: 0 to 6%,
   $Al_2O_3$: 0 to 5%,
   $K_2O$: 0 to 5%,
   FeO: 0.13 to 0.9%,
   total iron as represented by $Fe_2O_3$: at least 0.8% and less than 2.4%,
   $TiO_2$: more than 1% and at most 5%;
   containing from 100 to 500 mass ppm of CoO, from 0 to 70 mass ppm of Se and from 0 to 800 mass ppm of $Cr_2O_3$ in a total content of CoO, Se and $Cr_2O_3$ of less than 0.1 mass % based on the total content of components of the glass matrix composition; and
   having an ultraviolet transmittance (TUV) (ISO9050: 2003) of at most 2% at a thickness of 3.5 mm.

2. An ultraviolet absorbing glass article comprising, as a glass matrix composition as represented by mass % based on oxides:
   $SiO_2$: 66 to 75%,
   $Na_2O$: 10 to 20%,
   CaO: 5 to 15%,
   MgO: 0 to 6%,
   $Al_2O_3$: 0 to 5%,
   $K_2O$: 0 to 5%,
   FeO: 0.13 to 0.9%,
   total iron as represented by $Fe_2O_3$: at least 0.8% and less than 2.4%,
   $TiO_2$: more than 1% and at most 5%;
   containing from 200 to 500 mass ppm of CoO, from 3 to 70 mass ppm of Se and from 0 to 800 mass ppm of $Cr_2O_3$ in a total content of CoO, Se and $Cr_2O_3$ of less than 0.1 mass % based on the total content of components of the glass matrix composition; and
   having an ultraviolet transmittance (TUV) (ISO9050: 2003) of at most 2% at a thickness of 3.5 mm.

3. The ultraviolet absorbing glass article according to claim 1, further comprising:
   from 0 to 1 mass % of NiO based on the total content of components of the glass matrix composition.

4. The ultraviolet absorbing glass article according to claim 1, which has the ultraviolet transmittance (TUV) (ISO 9050:2003) of at most 2% at a thickness of 2.5 mm.

5. The ultraviolet absorbing glass article according to claim 1, which has a visible light transmittance (TVA) (JIS R3106 (1998)) of at least 10% and at most 20% as measured by using a standard illuminant A at a thickness of 3.5 mm.

6. The ultraviolet absorbing glass article according to claim 1, which has a visible light transmittance (TVA) (JIS R3106 (1998)) of at least 10% and at most 35% as measured by using a standard illuminant A at a thickness of 2.5 mm.

7. The ultraviolet absorbing glass article according to claim 1, which has a solar transmittance (TE) (JIS R3106 (1998)) of at most 25% at a thickness of 3.5 mm.

8. The ultraviolet absorbing glass article according to claim 1, which has a solar transmittance (TE) (JIS R3106 (1998)) of at most 35% at a thickness of 2.5 mm.

9. The ultraviolet absorbing glass article according to claim 1, which has a dominant wavelength (λD) of from 485 to 580 nm as measured by using a standard illuminant C at a thickness of 3.5 mm, and an excitation purity (Pe) of at most 25% as measured by using a standard illuminant C.

10. The ultraviolet absorbing glass article according to claim 1, which has a dominant wavelength (λD) of from 485 to 580 nm as measured by using a standard illuminant C at a thickness of 2.5 mm, and an excitation purity (Pe) of at most 45% as measured by using a standard illuminant C.

11. The ultraviolet absorbing glass article according to claim 1, wherein the contents as represented by mass % of trivalent iron as represented by $Fe_2O_3$ and $TiO_2$ satisfy:

$$-3.58 \times (Fe_2O_3) - 0.606 \times (TiO_2) \leq -3.5.$$

12. The ultraviolet absorbing glass article according to claim 1, which contains at least 3 mass ppm of Se based on the total content of components of the glass matrix composition.

13. The ultraviolet absorbing glass article according to claim 1, which contains at least 5 mass ppm of Se based on the total content of components of the glass matrix composition.

14. The ultraviolet absorbing glass article according to claim 1, which contains at least 16 mass ppm of Se based on the total content of components of the glass matrix composition.

15. The ultraviolet absorbing glass article according to claim 1, which comprises, as the glass matrix composition as represented by mass % based on oxides, at least 1.5% of $TiO_2$.

16. The ultraviolet absorbing glass article according to claim 1, which comprises, as the glass matrix composition as represented by mass % based on oxides, at least 2.14% of $TiO_2$.

17. The ultraviolet absorbing glass article according to claim 1, which comprises, as the glass matrix composition as represented by mass % based on oxides, at least 1.0% of the total iron as represented by $Fe_2O_3$.

18. The ultraviolet absorbing glass article according to claim 1, which contains at least 200 mass ppm of CoO based on the total content of components of the glass matrix composition.

19. The ultraviolet absorbing glass article according to claim 1, wherein the contents as represented by mass % of trivalent iron as represented by $Fe_2O_3$ and $TiO_2$ satisfy:

$$-3.58\times(Fe_2O_3)-0.606\times(TiO_2)\leq-4.7.$$

20. The ultraviolet absorbing glass article according to claim 1, which has the ultraviolet transmittance (TUV) (ISO 9050:2003) of at most 0.8% at a thickness of 3.5 mm.

21. The ultraviolet absorbing glass article according to claim 1, which has a dominant wavelength (λD) of at least 500 nm as measured by using a standard illuminant C at a thickness of 3.5 mm.

* * * * *